A. J. COLLAR.
FISH LADDER.
APPLICATION FILED AUG. 5, 1912.
1,082,109.
Patented Dec. 23, 1913.
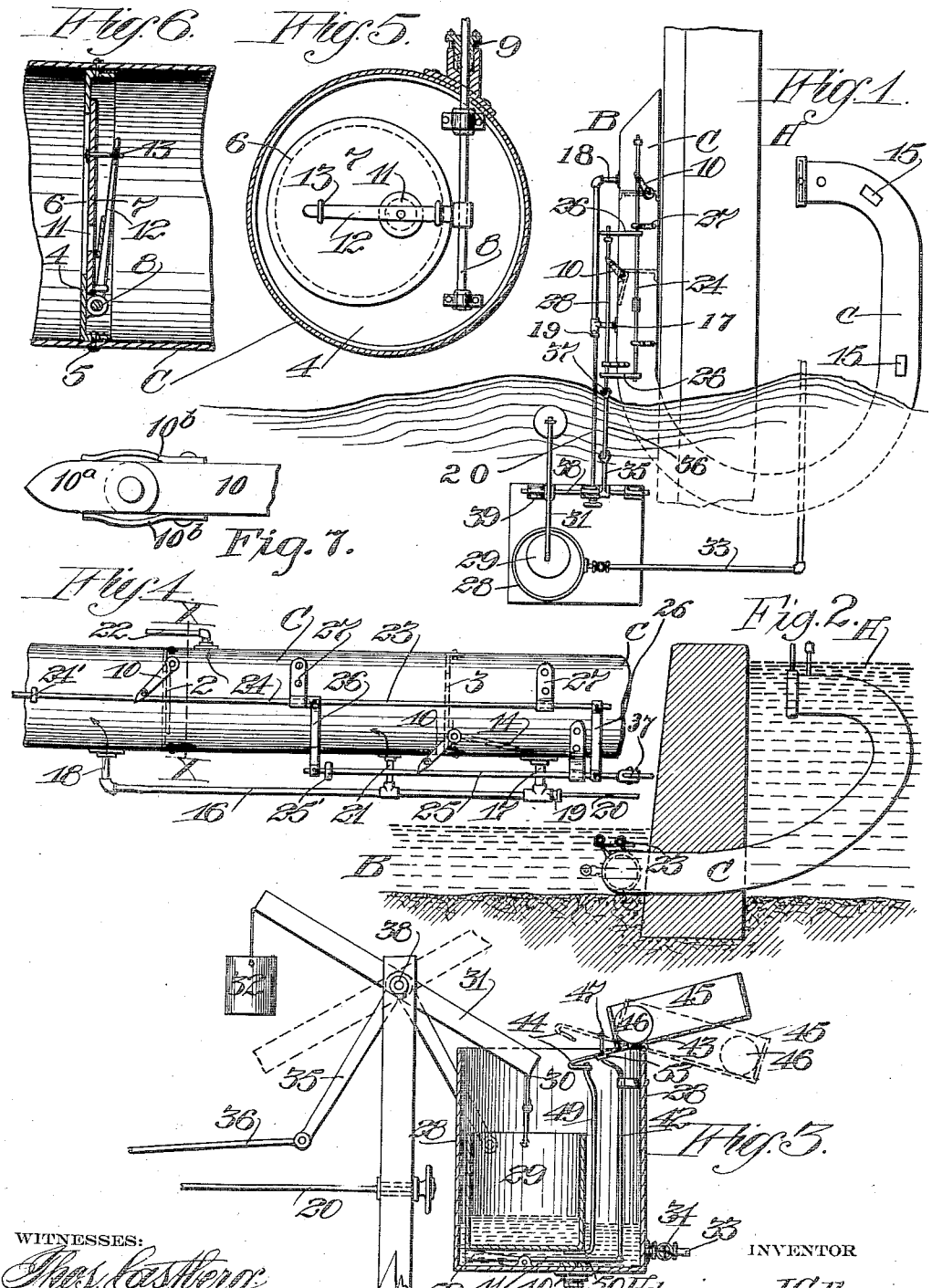

UNITED STATES PATENT OFFICE.

ADONIRAM J. COLLAR, OF YREKA, CALIFORNIA.

FISH-LADDER.

1,082,109.
Specification of Letters Patent.
Patented Dec. 23, 1913.

Application filed August 5, 1912. Serial No. 713,504.

*To all whom it may concern:*

Be it known that I, ADONIRAM J. COLLAR, a citizen of the United States, residing at Yreka, in the county of Siskiyou and State of California, have invented new and useful Improvements in Fish-Ladders, of which the following is a specification.

This invention relates to a fish ladder.

The object of the invention is to provide a fish ladder which will be simple, substantial and reliable in construction and which will permit the fish to pass in either direction from one body of water to another where these are located on different levels.

The invention consists in constructing or forming a tube, the size and thickness of which is to be determined by the height of the dam and the size of the fish that may use it.

It further consists in providing means for controlling the current flow through the tube and in providing automatic controlling means which open and close a series of lock gates to permit the passage of fish through the tube.

It also comprises details of construction which will be more fully explained by reference to the accompanying drawings, in which—

Figure 1 is a plan view showing a portion of the dam and fish ladder in position. Fig. 2 is a vertical section through the dam. Fig. 3 is a cross-section of the valve actuating tank. Fig. 4 is an enlarged plan view showing the valve operating mechanism. Fig. 5 is a cross section of the pipe on the line X—X of Fig. 4, showing the valve or lock gate construction. Fig. 6 is a cross-section of same. Fig. 7 is an enlarged detail view of the end of the crank arm.

This invention relates to a fish ladder of the lock system type, using a pipe or tube instead of an open canal; the object being to allow the fish to pass through the tube either one way or another from a higher level of water, like the up stream side of a dam, as A, to the lower level of the river or creek-bed below, indicated at B, or vice versa. A pipe as C connecting with a higher water level and a low one would have such a current flow through it that no fish could go up, and a very large quantity of water would go to waste. To avoid an excessive flow of water through the pipe I have provided a pair of valves or lock gates, as 2 and 3. It will be understood that I may employ any common form of a valve, mechanically operated at suitable time intervals, which may be mounted either in horizontal or vertical position, so that they will not swing shut of their own weight.

Referring to Figs. 5 and 6 of the drawings, a practically constructed lock gate or valve is shown, which consists of a seat or body portion 4, suitably secured by rivets 5, or like means, to the pipe C. This is provided with a suitable opening 6 adapted to be closed by a valve 7 secured to a shaft or pivot 8, mounted on the seat portion of the valve, and which extends out through the pipe C through a stuffing box 9. The upper end of the shaft 8 is provided with a crank arm 10, which is engaged by a suitable operating mechanism (hereinafter to be described), to open or close the valve 7 at suitable time intervals. The valve 7 is provided with a relief opening 11 which is opened just prior to the opening of the valve 7 for the purpose of relieving the valve proper of any undue pressure at the moment that this is to be opened.

The operation of the relief valve and opening of the valve proper will be as follows: The shaft 8 is provided with an arm 12 which swings in unison with the shaft 8 and the operating crank or rocker arm 10 on the outside of the pipe. When the crank arm 10 is moved from one side to another to open a lock gate, the arm 12 will swing with the shaft. The first movement of the arm 12 will act to uncover the relief opening 11 in the valve proper, thus releasing any undue pressure on same. A further movement of the arm 12 will bring the outer end of the same in position in a U-shaped bracket 13, secured to the valve 7, where it will engage this and move the valve 7 into an open position, shown by dotted lines as 14, Fig. 4.

It will be understood that in order to avoid a strong current flow through the pipe, it will be necessary to hold one of the gate locks in a closed position, and in order to admit the passage of fish through the pipe it will be necessary to open and close the gates at suitable time intervals, so as to admit the fish to pass from one lock to another in the tube, while passing through same. If the fish enter the tube while the lower lock gate is closed, they are restrained from going farther, but this will open at a certain time interval and allow the fish to pass up the tube to the second valve. This valve is closed previous to the opening of the first mentioned valve, and while the fish are standing in front of this valve, the lower valve will close and the upper valve will open a moment after the closing of the lower valve. This will allow the fish to pass through the upper valve and will also prevent the fish from returning by the lower valve as this is closed. The fish prevented from going back will thus pass on through the upper gate and will escape through the upper portion of the pipe into the dam.

In applying this fish ladder or lock system, using a pipe instead of an open canal, it is obvious that the fish may pass either way through the conduit. One valve being closed will stop an excessive current flow through the pipe.

In installing a fish ladder of this kind it may be constructed of a pipe, a tunnel, or any suitable conduit, through which the fish may pass from one water level to another, and it will be understood that this conduit may pass through, over, or around the bank or dam.

Any suitable number of light openings or windows, as 15, may be placed in the side or top of the tube; the number to be regulated by the size and length of same.

From the foregoing description it is understood that one of the lock gates is always closed. This would, practically speaking, entirely prevent any current flow through the pipe.

In order to induce fish to enter the pipe or conduit, it is necessary to allow a current flow through the conduit. This current flow is created by providing a by-pass around the valves and through the valves, which by-pass consists of a pipe 16 connected at each end as 17 and 18, with the portions of the pipe extending from either side of the lock chamber. The upper end of the pipe 16 is provided with a valve 19, and is provided with an extension rod 20 and a hand-wheel, by which the amount of water passing through the by-pass may be controlled from the bank.

In order to produce a certain amount of current flow within the lock chamber of the ladder, I have shown it as provided with a connection 21 and a discharge outlet 22, which will allow a certain amount of water to pass through the lock chamber. The same results may be produced by providing the lock gate proper with small openings which will allow a certain amount of water to pass through, producing a slight current flow through the pipe; or the same result may be produced by allowing a slight leakage around the lock gate seats. However, the last named means can only be used where the water level between the two bodies is not too great; any variation in water level causing too much pressure would tend to wash out the valve seats and destroy the operation of same.

The closing and opening of the lock gates is produced by the following mechanism: 23 indicates in general a slide frame consisting of two parallel rods 24 and 25, connected together by cross arms 26. This slide frame is appropriately mounted for reciprocation in suitable bearings 27 secured to the conduit C. The rod 24 is provided with a lug 24' and rod 25 with a lug 25', which lugs are so positioned on the frame with relation to the crank arms 10 on the lock gates that when the frame is reciprocated by means hereinafter to be described, the lug 25' will first engage the crank arm 10 and close the upper lock gate before lug 24' engages with the crank arm 10 to open the lower lock gate. The lugs after closing the upper gate and opening the lower gate will slip by the crank arms and pass on as far as they can be carried by the slide frame. The outer ends of the crank arms 10 are provided with spring-actuated, pivotally mounted dogs 10$^a$ which are held in normal position by a pair of springs 10$^b$. The gate actuated by the crank arm is thrown into complete open or closed position, as shown in Fig. 4, before the crank arm is moved completely out of the path of the lug 25'. The spring-supported dog 10$^a$ will yield sufficiently to permit the lug to pass and will immediately spring back into normal position, being forced back by the pressure of one or the other of the springs 10$^b$. The crank arm is thus always in position to be actuated by the lug 25' and is never moved into a position where it would be out of the path of the lug. It can be seen by referring to Fig. 4, that the lugs 24' and 25' move much farther than is actually necessary to open and close the gates. The idle movement of the lugs, after having actuated the gates, is for the purpose of leaving the valves in their respective open and closed position for some little time before they are moved again. This time interval may represent any time, as 5 or 10 minutes. The actual time consumed in closing one gate and opening the other may be represented by two or three minutes. This slow method of opening and closing the valves will not scare the fish and eliminates all danger of catching and crushing them in the gates while these are opening or closing.

The mechanism here employed for the purpose of reciprocating the slide frame consists of a tank 28, in which is mounted a float 29, suitably secured as at 30 to a centrally pivoted arm 31, which is also provided with a weight 32 at its opposite end. The tank 28 is adapted to be filled with water through a pipe 33 connected with any suitable source of supply, and is provided with a valve 34 by which the inflow of water to the tank may be controlled to increase or decrease the time interval consumed in filling the tank, which time interval may represent the sliding movement of the frame in one direction; movement being transmitted through a crank arm 35 and link 36, which is secured to the slide frame at 37; the crank arm 35 being suitably secured to a shaft 38 appropriately journaled in bearings 39; the crank arm 35 and centrally fulcrumed lever 31 being connected or otherwise secured to the shaft 38, so that any movement of the float 29 will transmit motion through the lever, shaft and crank arm 35 to reciprocate the slide frame. The tank is also provided with a discharge pipe 39 controlled by a valve 40, which is secured to a pivoted and weighted lever 41. The opposite end of the lever is secured to a vertically disposed trip-rod 42 which is operated by a fulcrumed lever 43 actuated by the rise of the float 29 within the tank 28 as this becomes filled. As the float 29 rises to a certain height, the upper edge will engage with the outer end 44 of the fulcrumed lever 43. This lever is provided with a guide-way or track portion 45 in which is placed a ball 46, or like rolling weight, so positioned that when the lever 43 is raised above a horizontal line by the rising of the float 29, the weight will immediately roll to the opposite end of the lever 43 and cause this to assume the position indicated by dotted lines in Fig. 3. The sudden tilting of the lever caused by the rising of the tank and the movement of the weight 46 from one end to the other causing the lever 43 to be instantly rocked into its opposite position, will cause the inner end of the lever 43 to engage with a head 47 on the end of the rod 42 and lift this sufficiently to raise the valve 40 from its seat and allow the water in the tank to escape through the discharge pipe 39. The time interval consumed in emptying the tank 28 represents the opposite reciprocal movement of the slide frame, which movement opens the upper gate and closes the lower gate. The lowering of the float 29 to a certain position within the tank will cause this to engage with a suspended rod 49, secured on the inner end of the lever 43. The suspended rod 49 is provided with a hook portion at its lower end with which the tank will engage, causing the lever 43 to be rocked into the position shown in full lines in Fig. 3, which will cause the weight 46 to roll back as shown. The lever 41, upon which is secured the valve 40, is provided with a weight 52 for the purpose of balancing the rod 42, so that the valve 40 will remain open while the lever 43 is returning to the position shown in full lines in Fig. 3. It will then be instantly closed by the lever 43 engaging with stop 53 on the rod 42. The suction and the water pressure on the valve 40, when this is closed, will prevent the weight 52 from opening the valve when the float 29 is rising, or until the lever 43 is rocked, for the purpose of opening the same.

In operation the conduit or pipe C is laid on or near the bottom of the creek or river-bed, close up against the lower side of the dam, with its lower end opening at right angles to the flow of the stream with the conduit laid crosswise of the stream as shown in Fig. 1, and its open end laid in the eddy close to the dam. Fish will have very little trouble when nosing around the lower side of the dam to find the entrance to the pipe. If they enter while the lower lock is closed, they are restrained from going farther, but this will open at a suitable time interval, and allow the fish to pass up the tube to the second lock. The water passing through the tube, caused by the by-pass connections, will cause them to remain in the tube while attempting to go up against the current. The lower gate or valve will then close after a suitable time interval, or a moment before the upper valve opens this will momentarily inclose the fish between the two gates, but only until the upper gate opens; they will then have a free passage through the upper end of the pipe and will escape into the dam.

It will be understood that the slight current flow through the pipe for the purpose of inducing or luring fish up the conduit may be accomplished in different ways, and I do not wish to limit myself to the specific construction here shown. Any convenient means which will allow a mild current to pass through the body of the conduit may be employed.

The fish ladder is practical, substantial, prompt and reliable in its actions, and takes less space than common fish ladders heretofore employed. The materials and finish of the several parts are such as experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. In a fish ladder an open ended pipe having its lower portions substantially parallel with the face of the dam and submerged in the water of the lower level, said pipe being curved through the dam with its upper end in the water of the upper level, shafts and gates within the pipe, exterior rocker arms on the shafts, a slide frame, and contact lugs carried by the frame and engaging the rocker arms to successively open and close the gates.

2. In a fish ladder, an open ended pipe connecting the waters of upper and lower levels, gates disposed at a distance apart within the pipe, gate shafts having exterior rocker arms, slidable frames having lugs disposed to successively engage the rocker arms and open the gates, and means to automatically actuate the slidable frames.

3. In a fish ladder, an open ended pipe connection between waters of different levels, gates mounted upon shafts within the pipe at a sufficient interval to admit the fish, rocker arms upon the outer ends of the gate shafts, a slide frame with lugs adapted to engage the rocker arms, one after the other to open the gates at suitable intervals, and mechanism actuated by the flow of water to reciprocate the slides.

4. The combination with a fish ladder having alternately opening and closing gates mounted upon shafts with rocker arms and a slidable frame, with lugs to engage the rocker arms, of a lever connected with the slide, a tank, a float therein connected with the lever, supply and discharge means connected with the tank to alternately raise the float and actuate the slide and the gates.

In testimony whereof I have hereunto set my hand in the presence of two subscribing witnesses.

ADONIRAM J. COLLAR.

Witnesses:
C. J. LUTTRELL,
A. H. PASHBURG.